(12) United States Patent
Aebischer et al.

(10) Patent No.: US 11,397,076 B2
(45) Date of Patent: Jul. 26, 2022

(54) DIGITIZER FOR AN OPTICAL COHERENCE TOMOGRAPHY IMAGER

(71) Applicant: ACQIRIS SA, Plan-les-Ouates (CH)

(72) Inventors: Daniel Aebischer, Avully (CH);
Pierre-François Maistre, Annecy (FR);
Tobias Blaser, Grand-Lancy (CH)

(73) Assignee: Acqiris SA, Plan-les-Ouates (CH)

( * ) Notice: Subject to any disclaimer, the term of this patent is extended or adjusted under 35 U.S.C. 154(b) by 0 days.

(21) Appl. No.: 16/963,582

(22) PCT Filed: Jan. 26, 2018

(86) PCT No.: PCT/IB2018/050489
§ 371 (c)(1),
(2) Date: Jul. 21, 2020

(87) PCT Pub. No.: WO2019/145754
PCT Pub. Date: Aug. 1, 2019

(65) Prior Publication Data
US 2021/0055096 A1 Feb. 25, 2021

(51) Int. Cl.
*G01B 9/02* (2022.01)
*G01B 9/02055* (2022.01)
*G01B 9/02004* (2022.01)
*G01B 9/02091* (2022.01)

(52) U.S. Cl.
CPC ..... *G01B 9/02067* (2013.01); *G01B 9/02004* (2013.01); *G01B 9/02083* (2013.01); *G01B 9/02091* (2013.01)

(58) Field of Classification Search
CPC ............ G01B 9/02067; G01B 9/02004; G01B 9/02083; G01B 9/02091; G01B 9/02027; G01B 9/02044
See application file for complete search history.

(56) References Cited

U.S. PATENT DOCUMENTS

| 2012/0162659 | A1* | 6/2012 | Goldberg | A61B 5/0066 |
| | | | | 356/479 |
| 2015/0109621 | A1 | 4/2015 | Huber et al. | |
| 2016/0025478 | A1 | 1/2016 | Johnson et al. | |
| 2017/0241763 | A1 | 8/2017 | Wang et al. | |
| 2017/0307353 | A1 | 10/2017 | Liu et al. | |

FOREIGN PATENT DOCUMENTS

| JP | 2015198757 A | 11/2015 |
| JP | 2017211192 A * | 11/2017 |

OTHER PUBLICATIONS

International Search Report and Written Opinion for PCT/IB2018/050489, dated Mar. 29, 2018, 13 pages.

* cited by examiner

*Primary Examiner* — Tarifur R Chowdhury
*Assistant Examiner* — Jonathon Cook
(74) *Attorney, Agent, or Firm* — Blank Rome LLP

(57) ABSTRACT

A digitizer and processor device for a swept-source optical coherence tomography (SS-OCT) imaging system, comprising: an input configured to receive an OCT signal; a control input configured to receive a k-clock signal; a combiner unit (130) receiving the OCT signal and the k-clock signal configured to output a composite signal; a digitizing unit (60) arranged to convert the composite signal into a digital composite signal (69); a data processing unit (70) arranged to determine a profile of optical density in a sample that generated the OCT signal based on the digital composite signal (69).

9 Claims, 2 Drawing Sheets

DIGITIZER FOR AN OPTICAL COHERENCE TOMOGRAPHY IMAGER

The present application is a national phase of international patent application PCT/IB2018/050489 of Jan. 26, 2018, the contents whereof are hereby incorporated in their entirety.

FIELD OF THE INVENTION

The present invention concerns, in embodiments, an electronic digitizer for an optical coherence tomography imaging system.

DESCRIPTION OF RELATED ART

Optical Coherence Tomography (OCT) is an emerging imaging technique that allows spatial reconstruction of sub-millimetre and micrometre structures in opaque structures. This imaging technique has been used in several biological and clinical applications including ophthalmology (possibly the most developed use case), gastroenterology, cardiology, oncology, intra-surgical imaging, and many others, including non-biologic applications.

OCT imaging is based on intensive digital signal processing techniques and requires, together with advanced optical systems, powerful signal processing platforms with specific architectures and innovative algorithms.

OCT uses an optical interferometer, for example having the classical Michelson structure, in combination with a low-coherency optical source to analyse subsurface structures in a sample, usually of biologic nature.

Early OCT implementation sere based on mechanical path-length scanning, In these system, known as Time Domain OCT or TD-OCT, an interference pattern is obtained by moving linearly the mirror of the reference arm of an interferometer, for example of the Michelson type, so that an interference pattern is obtained when the reference path length matches the optical path due to a reflection in the sample. The axial resolution is determined by the coherence length of the light source and is typically of the order of the micrometre.

In Fourier-domain Optical Coherence Tomography (FD-OCT) the light backscattered from the sample is mixed with reference light at a fixed group delay. Reflections at different depth in the sample generate oscillation in the interference spectrum. The frequency of these oscillations is linked to the delay, or to the optical path, of the original reflection, such that an inverse Fourier transform of the interference spectrum provides depth-scan information.

Spectral Domain OCT, also known as SD-OCT, uses a broadband light source with short temporal coherence (often a superluminescent light emitting diode: SLED), and the depth by measuring the spectral density in the detection arm of the interferometer, using a spectrometer, for example a diffraction grating. The spectrogram is often collected by a line photo detector, and the depth resolved structure of the sample can be derived by a Fourier transformation on the spectrogram.

Another recent implementation, known as Swept-source OCT or SS-OCT, replaces the broadband source with a frequency-swept optical source. In these instruments the spectral components of the signal are resolved in time; the detection arm of the interferometer is equipped with a single detector and a high-speed ADC, rather than with a spectrometer, with significant advantages in size, speed, performance, and cost.

Swept sources for OCT are, in general, tuneable lasers that are specially designed to allow high-speed scans. Current SS-OCT sources achieve 100 nm wavelength sweep range, with a repetition rate of 100 kHz, and an instantaneous linewidth of 100 pm, or better. A sweep cycle is common denoted as "A-scan", since it provides information on the axial profile in the sample, while the terms "B-scan" and "C-scan" indicate the motion of the light beam with respect to the sample to acquire the optical density in a slice, respectively a volume, of the sample.

In SS-OCT systems, the axial profile in the sample is obtained by the spectral density of signal detected at the interferometer detection arm, which can be readily obtained by a digital Fourier transform operation on the digitized signal, provided the sampled points are linearly spaced in optical wavenumber k. Most sources are incapable to produce a sweep in which the instantaneous wavenumber k is a linear function of time, and diverse hardware and software solutions have been devised to address this shortcoming. Mostly, they involve the generation of a reference signal, denoted as k-clock, which varies together with the optical wavenumber (or equivalently, the optical frequency) of the source. A k-clock signal may be obtained with an interferometer (for example a Mach-Zehnder interferometer) and a light detector, or by other known techniques.

It is known to use a high-frequency k-clock signal to clock an ADC converter, such that the OCT signal is sampled synchronously with the oscillations of the k-clock. This ensures that the samples of the OCT signal are uniformly spaced in the k-space (albeit their time distribution is not uniform). A shortcoming of this technique is, however, that the k-clock signal should have a temporal frequency that is at least twice that of the highest components of interest in the OCT signal.

Other known system sample both the k-clock and the OCT signal uniformly in time, and consequently non-uniformly in k-space, and then use the phase information contained in the k-clock to compute the depth profile based on the non-uniformly sampled OCT signal by a suitable digital processing unit. This operation often involves extracting the phase variation of the k-clock signal and resampling digitally the OCT signal at equally-spaced positions in the k-space. These systems do not require a high-speed k-clock, but are more computation-intensive, particularly if they operate in real time, and need an additional acquisition channel for the k-clock signal.

In several cases of use, simultaneous acquisition and processing of more than one OCT signal is required or advantageous. This situation arises in particular in polarization-sensitive instruments, which detect and process two polarization components of the light, and in multi-beam instruments.

Another issue with SS-OCT systems, especially those in which the OCT signals are uniformly sampled in time, is related to the uncertainty of positioning the sampling times with respect to the start of a sweep in the light source. The beginning of the sweep is in general marked by an A-scan trigger signal, which is used to to mark the region of interest of the OCT signals that should be memorized. As a rule, the exact instant of the A-trigger is known with an approximation of one sampling period, for example 1 ns, which is not a negligible source of error.

It is an aim of the present invention to provide a digitizer and processor device for an optical coherence tomography (OCT) imaging system with improved timing capabilities.

BRIEF SUMMARY OF THE INVENTION

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
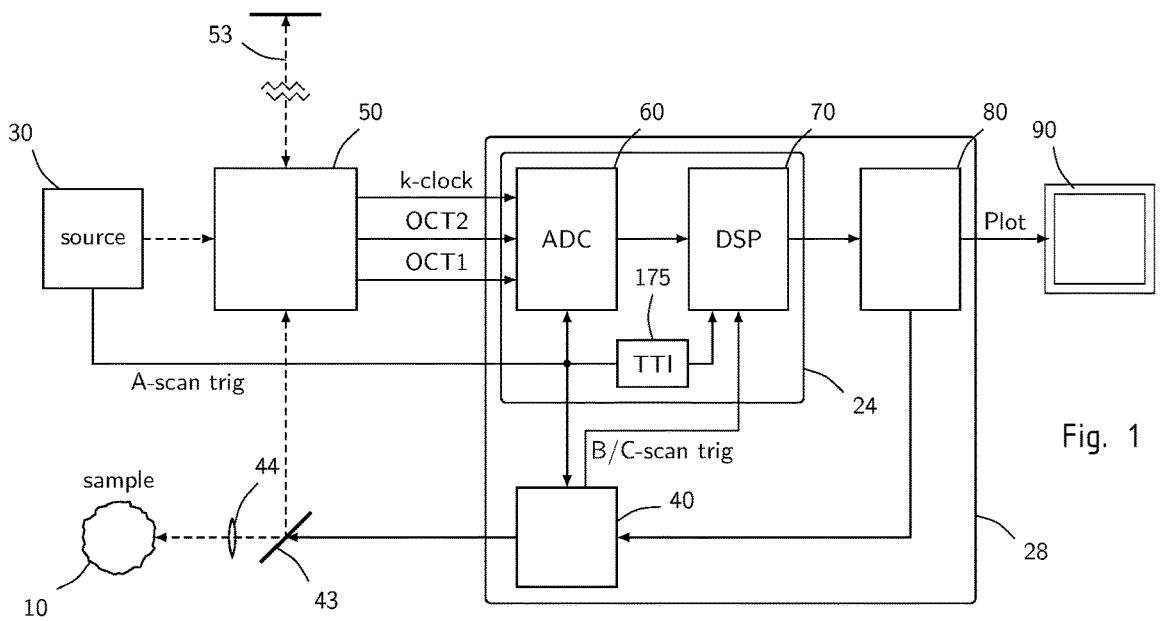
FIG. 1 shows schematically a view of a SS-OCT system according to an aspect of the present invention.

FIG. 1 illustrates schematically the structure of a swept-source OCT system according to the invention. The light source 30 is a broadband frequency-swept optical source optically connected with an interferometer setup 50. As it is known in the art, the interferometer 50 is used to analyse the light backscattered from a sample 10, and generates two or more electrical OCT signals OCT1, OCT2, as well as a k-clock signal. The sampling beam is focused by an optic device 44 and steered by a controlled mirror 43, under the supervision of a control unit 40, as it is known in the art.

The OCT signals OCT1, OCT2, as well as the k-clock signal are transmitted to an acquisition unit 24 that is especially adapted to digitize and process OCT signals. Preferably, as shown in the plot, the acquisition unit 24 is included in the same host system 20 as the optics control unit 80, although this is not an essential feature of the invention. The host system could be a personal computer, an industrial PC, or any other suitable device capable of digital processing. The acquisition unit 24 is preferably a modular card equipped with an interface compatible with a communication bus that ensures communication between the acquisition card 24 and the host 28. Any suitable interface may be adopted in the frame of the invention, including PXI, PCI express, USB, Thunderbolt™, or any other suitable connection.

The system comprises, preferably in the same acquisition unit 24, a digitizing unit 60, and a data processing unit 70. The latter may be embodied by a specially programmed FPGA, a programmable signal processor, or any suitable computing means. The purpose of the processing unit 70 is to provide a spectrogram, an A-scan profile, or an equivalent information to the application 80. This information can then be displayed on the visualization unit 90, stored for further analysis, transmitted to another processing unit (not illustrated), or put to any other use.

Preferably the acquisition unit includes also a trigger time-interpolation module 175 whose function is to improve the stability and the repeatability of the measurement, overcoming the discrete nature of the digital signal processing related to digitized reference time information, as it will be explained later.

As already mentioned, the k-clock is not related with the optical properties of the sample under study 10, but uniquely with the instantaneous wavenumber k of the light emitted by the OCT source 30. Importantly, the OCT signals OCT1, OCT2 and the k-clock present quite different spectral features, and, the OCT1, OCT2 signals can be shifted in a desired frequency band by changing the length of the reference arm 53 (FIG. 1); the optical device that generates the k-clock signal (for example, a Mach-Zehnder interferometer) can also be chosen or dimensioned in such a way that the k-clock spectrum is limited to a desired band of frequencies. According to an aspect of the invention, these parameters are chosen such that the spectra of the k-clock signal does not significantly overlap with the spectra of the OCT signal or signals, as illustrated in FIG. 2.

Figure 2:
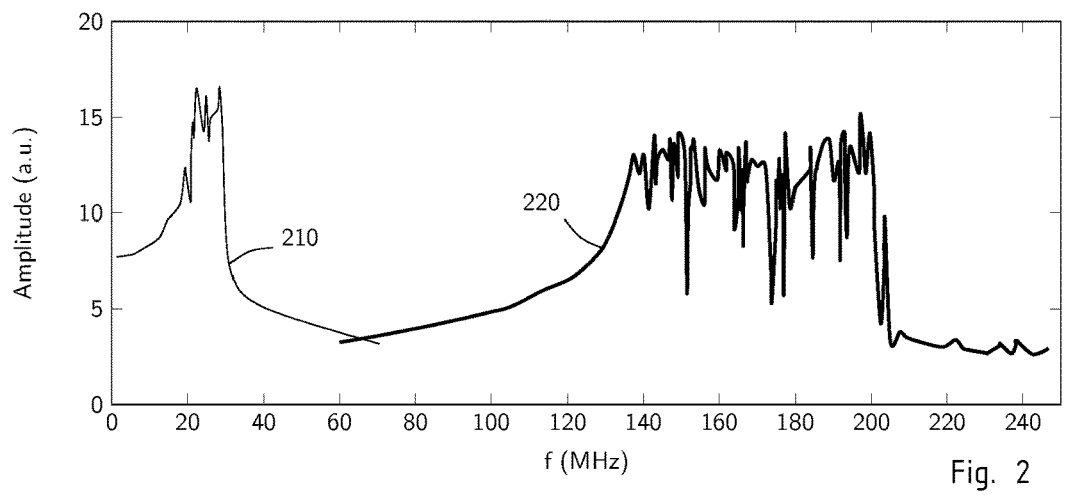
FIG. 2 plots spectra of input waveforms on which the device of the invention operates.

FIG. 2 shows the k-clock signal 210 in a lower frequency band than the OCT signal 220. The invention however contemplates the case in which the k-clock signal is in a frequency band above that of the OCT signal.

Alternatively, or in addition, should the k-clock signal and the OCT signal superpose slightly in frequency, they can be filtered such that their spectra do not overlap, without significant loss of performance.

Figure 3:
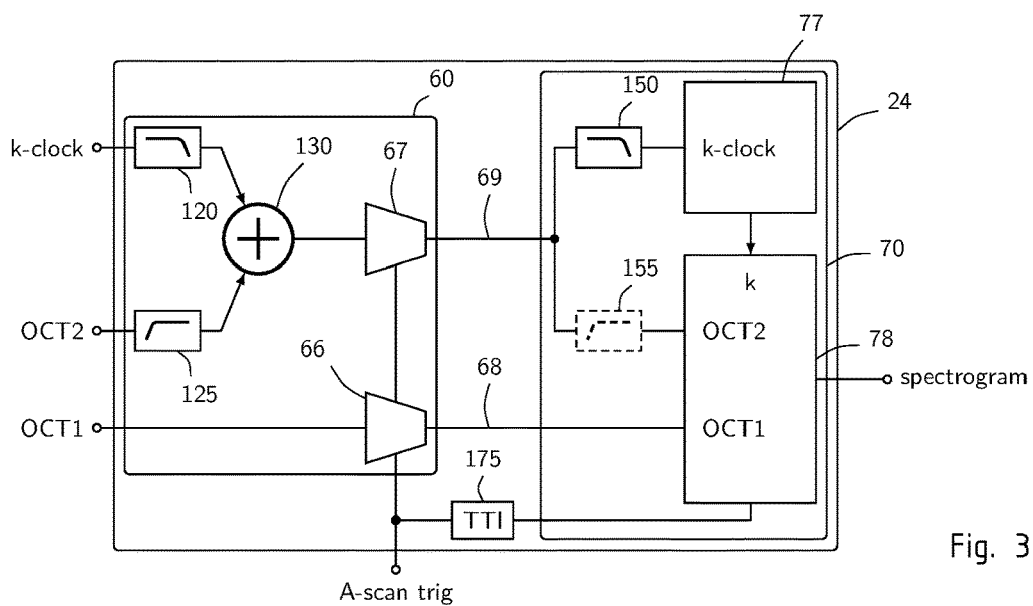
FIG. 3 is a block diagram showing a data processing system according to the invention.

FIG. 3 shows a possible implementation of the acquisition card 24 according to the invention. The acquisition card receives, as mentioned above, three analogue signals: the OCT signals OCT1, OCT2 from corresponding optical detectors in the spectrometer 50, and the k-clock signal.

The first OCT signal OCT1 is fed to the input of an analogue/digital converter 67a. Typically, an anti-aliasing filter will be inserted before the ADC, but it is not indicated in the drawing. The A/D converter 67a generates a digital OCT1 signal 68 that is a digital representation of the OCT1 signal at a predetermined sampling rate, bit resolution, and buffer depth. In embodiments, the digital signal 68 may have a sampling rate of 1 GS/s or 2 GS/s, each sample consisting in a 12 bits or 14 bits word, and a depth of 2048 to 8192 samples. These values are not limiting, however.

The second OCT signal OCT2 and the k-clock, instead, are summed together and fed to a second analogue/digital converter 67b. Preferably, a low-pass filter 120 and/or a high-pass filter 125 ensure that the spectra of the k-clock signal and of the OCT2 signal do not overlap. The illustrated example has a low-pass filter 120 on the k-clock input and a high-pass filter 125 on the OCT2 one but, these filters may be of the opposite kind if the k-clock signal is shifted above the OCT one. The filters 120 and 125 could possibly be omitted if the k-clock and OCT signal are inherently frequency-limited such that their spectra do not overlap.

The sum node 130 could be embodied by a passive 50Ω splitter used as mixer, or any other suitable device. The second A/D converter 67b generates a digital signal 69, which is a digital representation of OCT2+k-clock. Preferably, the sampling rate, bit resolution, and buffer depth of the composite digital signal 69 are the same as those of the first digital signal 68, and the samples of the composite signal 69 are synchronous with those of the first signal 68.

The A-trigger signals the start of a wavelength sweep cycle of the source 30, and is used to align the digital signals 68, 69 in their respective data buffers. It is also made available to the data processing unit 70, through the trigger time-interpolation module 175.

Figure 5:
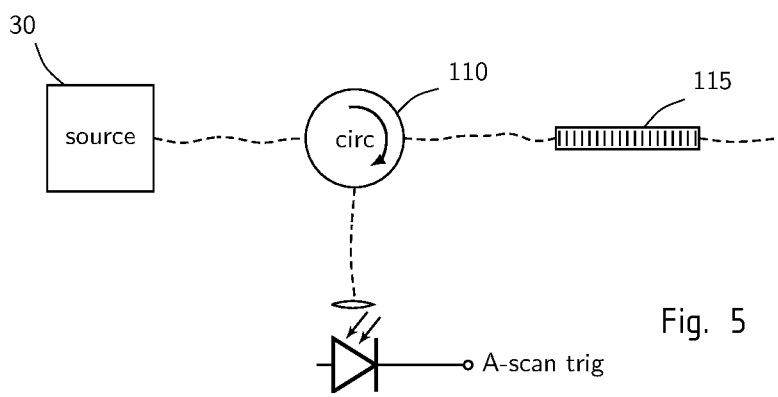
FIG. 5 illustrates a trigger generator.

The A-trigger may be generated by the scanned source 30 or, preferably, by an optical detector arranged to determine when the light generated by the source 30 has a predetermined wavelength in the sweep range. Such a detector may include a fibre Bragg Grating 115, a circulator 110, and a photodetector sensitive to the radiation reflected from the grating, as illustrated in FIG. 5.

The data processing unit 70 that may comprise a signal extraction filter 150 arranged to extract the k-clock signal from the digital composite signal 69, and possibly a second filter 155 arranged to extract the OCT2 signal from the composite signal 69; a k-clock processing unit 77, and a resampling/spectral processing unit 78 that is arranged to produce one or several profiles of the sample 10. Although these elements are here presented separate for the ease of understanding, they should be understood in the functional sense, and may share common resources in embodiments. They could indeed be partly or fully defined by software and need not be embodied by separated physical circuits. In a preferred embodiment, the data processing unit includes a field-programmable gate array (FPGA).

In the presented example the signal extraction filter 150 is a low-pass filter and the second filter 155 is a high-pass one, because the frequency domain of the k-clock signal is below that of the OCT signal. In the opposite case, filter 150 would be of high-pass type, and filter 155 of low-pass type.

Figure 4:
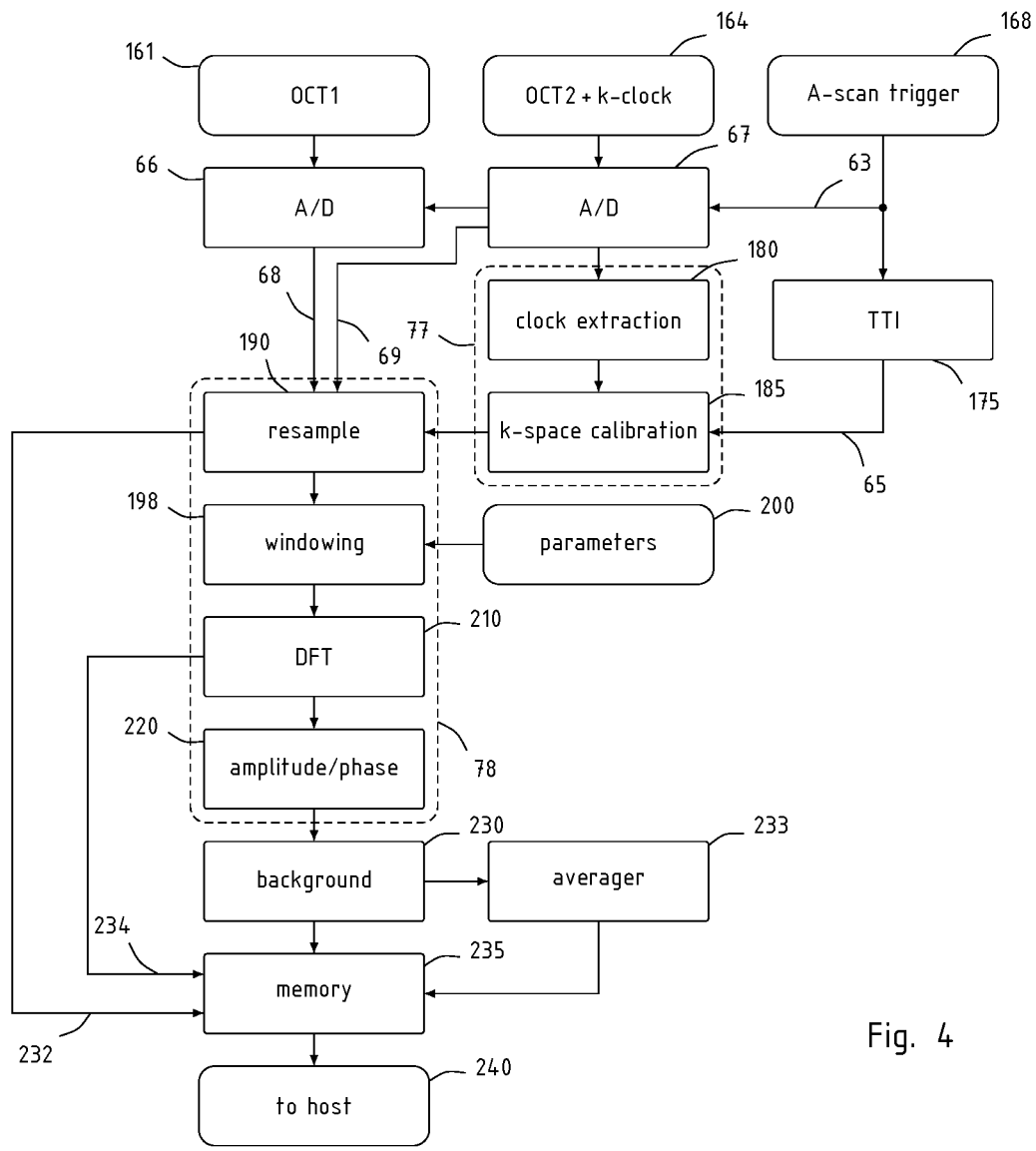
FIG. 4 illustrates a process of generating an OCT signal.

The flow of the data processing unit 70 will now be described with reference to FIGS. 3 and 4. Block 77 dedicated to processing the k-clock signal that is extracted (step 180) from the composite digital signal 69. Step marked 185 consists in a calibration of the k-space that is, the definition of a correspondence between the sample index of the digital signals 68, 69 and the instantaneous wave number of the light from the source 30 or, otherwise said, determining the values of the wavenumber corresponding to sample times of the digital OCT signal, based on the digital k-clock signal.

A possible algorithm to reconstruct the wavenumber k consists, for example, in computing the Hilbert transform of the k-clock signal, selecting its complex argument that corresponds to the phase of the k-clock, and unwrapping it to eliminate discontinuities. The unwrapped phase is proportional to the wavenumber, and can converted into it by applying a suitable calibration. The reconstruction of k can be made for each A-scan in real time, or result from the combined processing of several A-scans.

The timing information of the A-scan trigger is used to time the A/D converters 66, 67 (arrow 63) such that the trigger falls at a predetermined position in the acquisition buffer. As mentioned in the preamble, this leaves an uncertainty of one sampling period (for example 1 ns) on the exact trigger position. The TTI unit 175 includes a fast TDC (Time to Digital Converter) that measures a time offset between the sampling clock of the A/D converter and the leading edge of the A-scan trigger signal. Typically, the TTI unit can determine the position in time of the trigger with an uncertainty much smaller than the sampling period, for example a factor 10 or smaller, or with an uncertainty lower than 100 ps.

The TTI unit introduces a correction (array 65) to the values of the wavenumber computed in the k-space calibration step 185, based on the temporal position of the trigger relative to the sampling clock of the A/D converters. The correction may include any or more of the following:
time-shifting the k-clock calibration by an amount given by the position of the trigger,
computing a (possibly not constant) phase shift based on the position of the trigger and adding it numerically to the unwrapped phase,
any other suitable correction.

The inventors have found that such corrections improve considerably the phase stability of the resulting OCT profiles, which is especially significant for polarization-sensitive applications.

In a preferred embodiment, the digital signals 68, 69, that are sampled by the A/D converters at uniformly spaced points in time, are resampled at evenly spaced points in the wavenumber k (step 190). The resulting vectors may then be windowed (step 198), based on a window function selected by the host system (step 200), a digital Fourier transformation is applied (step 210), the amplitude and preferably also the phase of the resulting spectrum are detected (step 220). Preferably, the data processing unit implements also background subtraction (step 230) and averaging (step 233).

In a possible variant, the digital signals OCT1 and OCT2 may be treated as nonuniform samples in k-space and processed by a suitable non-uniform discrete Fourier transform operator, rather than evenly resampled in k and then DFT-transformed.

Since the unit 78 performs in any case a spectral selection, the input high-pass filter 155 may possibly be omitted, considering that the contribution of the k-clock 210 will be negligible in the depth range of interest. A prefilter 155, operating on the t-sampled data rather than in k-space may be advantageous, however.

The processed data are stored in a memory unit 235 whence the host system can collect them (step 240) through the card's data interface, for example a PCIe bus. In a preferred embodiment, the resampled OCT signals and/or the raw OCT signals (arrow 232), as well as the complex DFT output (arrow 234), are addressable in memory and can be uploaded to the host on request.

Although the invention has been described in the important use case of a dual-channel OCT, this is not an essential limitation. The invention could in fact be usefully applied to a single-channel OCT system, with a single ADC digitizing a composite signal combining an OCT signal and a k-clock signal. Also, the invention includes system with an arbitrary number N of OCT channels, with N A/D converters, in which at least one converter digitizes a composite signal combining an OCT signal and a k-clock signal in distinct frequency bands.

REFERENCE SIGNS USED IN THE FIGURES 10 sample
24 acquisition card
28 host system, PC
30 swept source
40 optics control unit
43 galvanometer mirror
44 optics
50 interferometer/detector/circulator
53 reference arm
60 digitizing unit"
63 A/D start
65 trigger time compensation
66 A/D converter
67 A/D converter
68 digital composite signal
69 digital OCT1 signal
70 data processing unit
77 k-clock processing
78 spectral processing unit
80 application logic
90 display
110 circulator
115 Fiber Bragg Grating
120 low-pass filter
125 high-pass filter
130 analogue sum
150 digital low-pass filter:
155 digital high-pass filter
161 OCT1 signal
164 OCT2+k-clock signals 168 A-scan trigger
175 Trigger Time Interpolation
180 clock extraction
185 k-space linearization and calibration
190 resample
198 windowing
200 parameters from host
210 DFT
220 magnitude/phase calculation
230 background subtraction
233 averaging
235 memory
240 to host

The invention claimed is:

1. A digitizer and processor device for a swept-source optical coherence tomography imaging system, comprising:
an input configured to receive an OCT analogue signal;
a control input configured to receive a k-clock analogue signal;
a combiner unit receiving the OCT analogue signal and the k-clock analogue signal, configured to output a composite analogue signal;
a digitizing unit arranged to convert the composite analogue signal into a digital composite signal;
a data processing unit arranged to determine a tomographic profile of the sample that generated the OCT signal based on the digital composite signal,
wherein the data processing unit comprises one or more digital filters arranged to extract from the digital composite signal a digital OCT signal representing the contribution of the OCT signal to the digital composite signal, and a digital k-clock signal representin the contribution of the k-clock signal to the digital composite signal.

2. to The digitizer and processor of claim 1, wherein the data processing unit is arranged to determine the values of the wavenumber corresponding to sample times of the digital OCT signal, based on the digital k-clock signal.

3. The digitizer and processor of claim 2, including a trigger input for receiving a trigger signal marking the occurrence of a scan of a swept light source, wherein the digitizing unit generates the digital composite signal as a vector of samples synchronised with an A/D clock, the trigger falling at a predetermined position in the vector.

4. The digitizer and processor of claim 3, wherein the data processing unit comprises a trigger time interpolation unit, arranged to determine a temporal position of the trigger signal, relative to the A/D clock, and to apply a correction to the values of the wavenumber corresponding to sample times of the digital OCT signal, based on said position.

5. The digitizer and processor of claim 1, wherein the data processing unit is arranged to compute a resampled digital OCT signal whose samples are taken at uniformly spaced wavenumbers.

6. The digitizer and processor of claim 1, wherein the data processing unit is arranged to compute a non-uniform discrete Fourier transform on the digital OCT signal.

7. The digitizer and processor device of claim 1, comprising at least one additional input for the acquisition of at least one additional OCT signal.

8. The digitizer and processor device of claim 1, comprising one trigger input arranged to detect a trigger signal indicating the start of a A-scan of a swept OCT light source, and wherein the digital processing unit is arranged to determine the profile of optical density in consideration of the time of arrival of the trigger signal.

9. The digitizer and processor device of claim 1 wherein, either the spectra of the k-clock analogue signal does not significantly overlap with the spectra of the OCT analogue signal, or the k-clock analogue signal and/or the OCT analogue signals are filtered such that their spectra do not overlap.

* * * * *